United States Patent [19]

Gutierrez et al.

[11] Patent Number: 5,027,950
[45] Date of Patent: Jul. 2, 1991

[54] DISPLAY AND HOLDER ASSEMBLY

[76] Inventors: Julian Gutierrez, 6205 SW. 116th St., Miami, Fla. 33156; Mark A. Jeffries, 6401 SW. 83rd St., Miami, Fla. 33143; Edward H. Marino, 9980 SW. 131st St., Miami, Fla. 33176

[21] Appl. No.: 481,902
[22] Filed: Feb. 20, 1990
[51] Int. Cl.⁵ .............................................. B65D 85/00
[52] U.S. Cl. ................................. 206/425; 206/309; 206/312; 206/444; 220/533
[58] Field of Search ............... 206/425, 311, 312, 444, 206/309, 387; 220/532, 533; 211/40

[56] References Cited

U.S. PATENT DOCUMENTS

| | | | |
|---|---|---|---|
| 4,234,089 | 11/1980 | Morris | 220/532 |
| 4,366,904 | 1/1983 | Roskvist | 220/532 |
| 4,641,897 | 10/1987 | Long et al. | 206/444 |
| 4,722,543 | 2/1988 | Hamilton | 220/533 |
| 4,776,482 | 10/1988 | Wolters et al. | 220/533 |
| 4,778,047 | 10/1988 | Lay | 206/425 |
| 4,781,292 | 11/1988 | Sacherman et al. | 206/425 |
| 4,819,802 | 4/1989 | Gutierrez | 206/387 |
| 4,844,260 | 7/1989 | Jaw | 206/444 |
| 4,850,477 | 7/1989 | Gelardi et al. | 206/425 |

Primary Examiner—David T. Fidei
Attorney, Agent, or Firm—Malloy, Downey & Malloy

[57] ABSTRACT

A support and display assembly for a plurality of thin, relatively lightweight objects such as floppy disks or diskettes, wherein a support frame has a plurality of holder structures rotatably mounted therein and annularly pivotal between two oppositely disposed angularly oriented positions wherein each of the holders and any object contained therein is disposed in a spaced apart, parallel relation to one another when in either of the two opposite positions and further wherein a braking structure is provided to restrict the pivotal movement of the holder structure such that such holder structures will not "automatically" successively travel between the aforementioned opposite positions by a forced displacement of one of such holders.

13 Claims, 4 Drawing Sheets

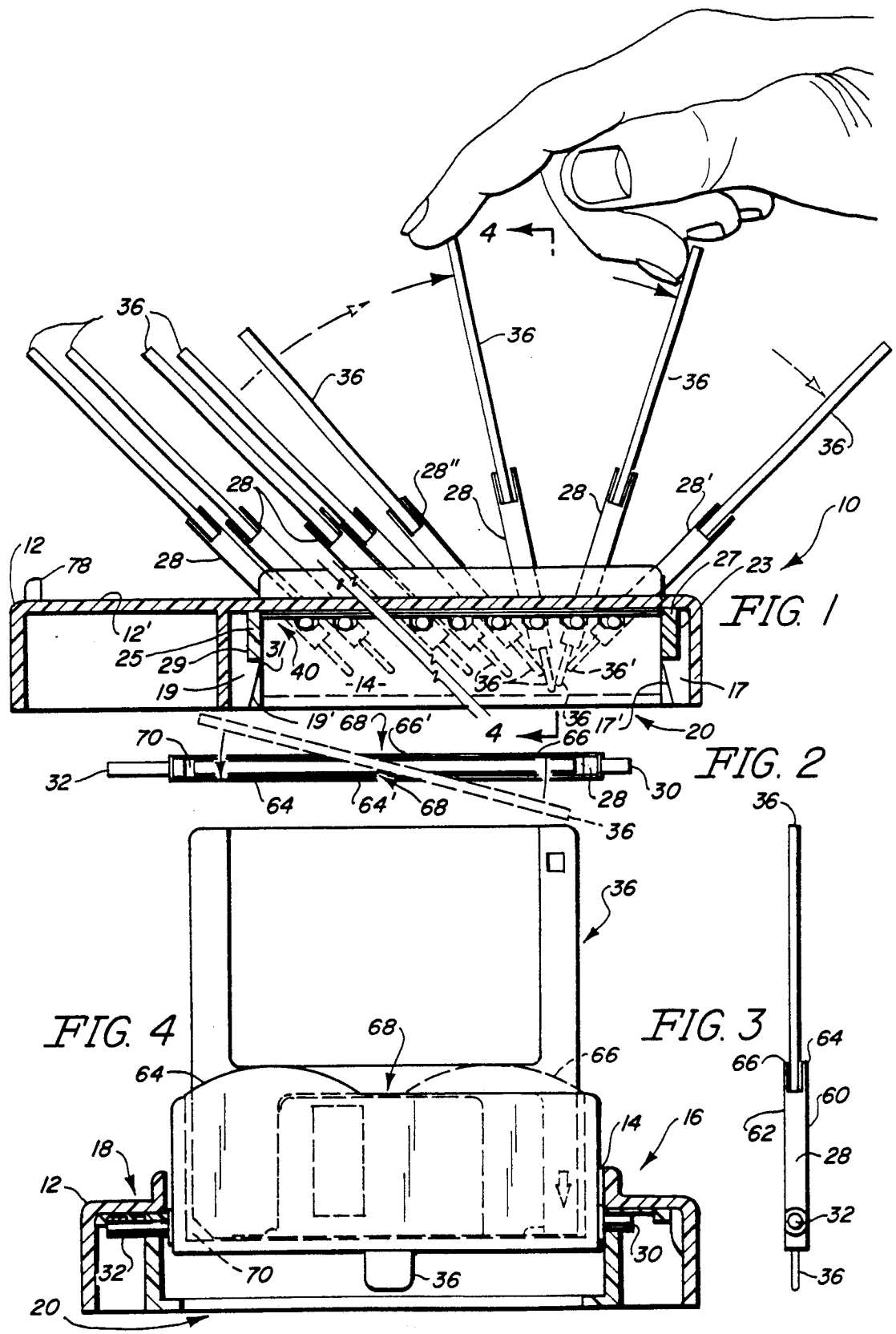

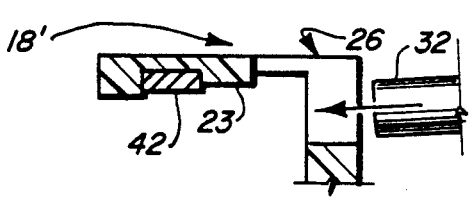
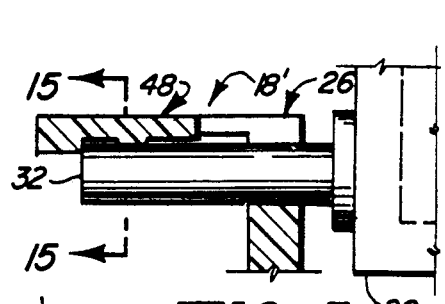
FIG. 6  FIG. 5
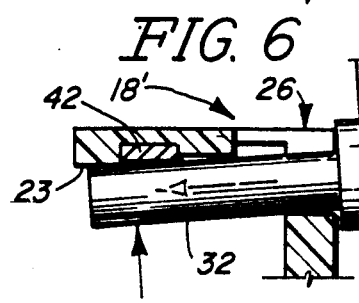
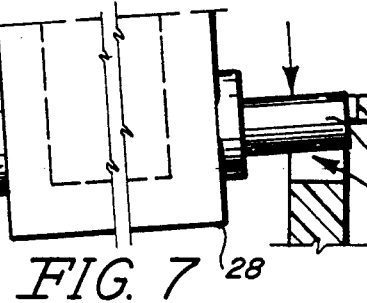
FIG. 7  FIG. 8
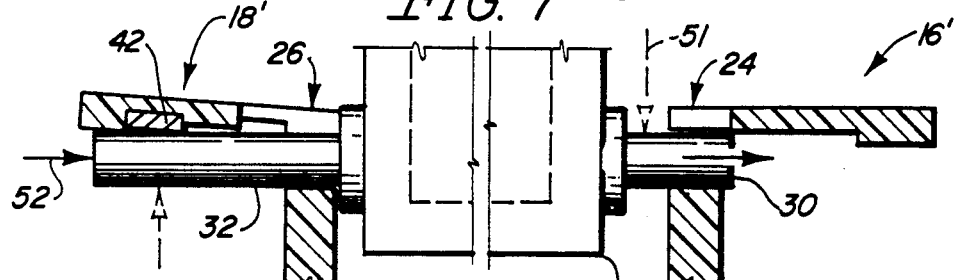
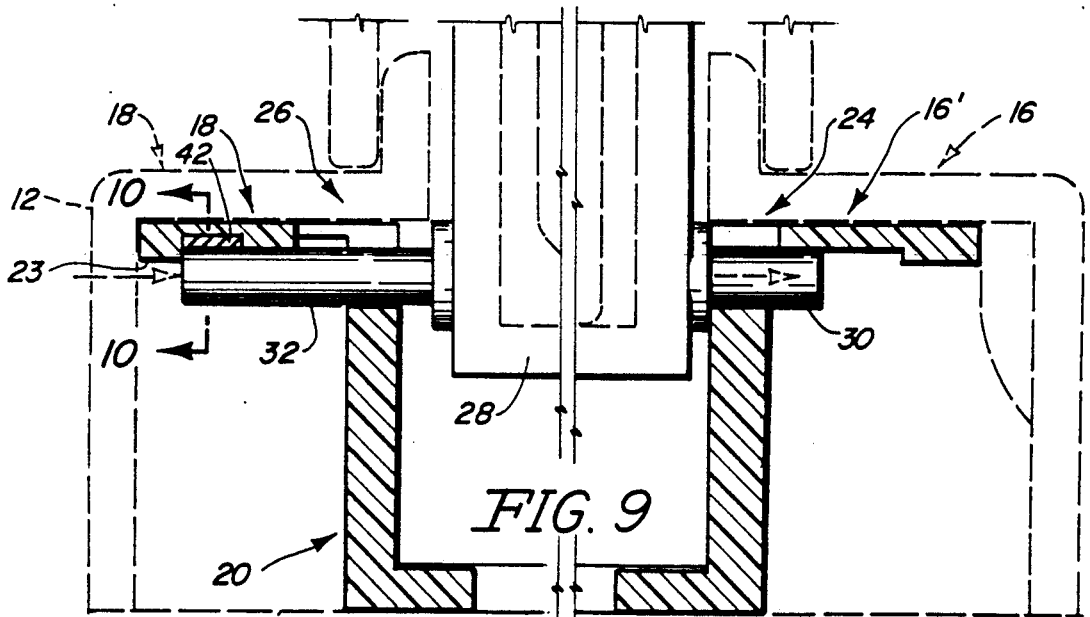
FIG. 9
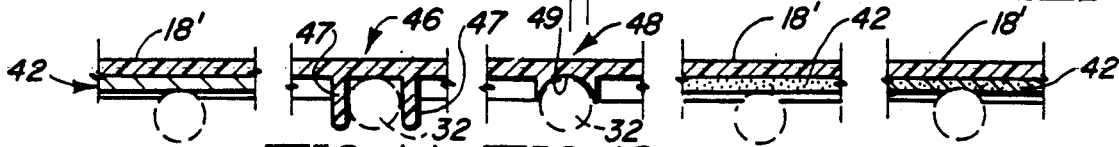
FIG. 10  FIG. 11  FIG. 12  FIG. 13  FIG. 14
FIG. 15  FIG. 16

DISPLAY AND HOLDER ASSEMBLY

BACKGROUND OF THE INVENTION

1. Field of the Invention

A support and display assembly to facilitate storage and display of each of a plurality of objects wherein each object is held in a rotatably mounted holder structure and each is individually positionable between two oppositely disposed angularly oriented positions wherein each of the objects being held may be easily viewed for selection as they travel between such opposite positions.

2. Description of the Prior Art

The U.S. Pat. No. 4,819,802 is directed to a "record finder" structure wherein a support frame has rotatably mounted thereon a plurality of holding devices specifically des igned to be pivotal and each more specifically structured to hold a phonographic record. This unit was specifically structured to be "automatic" in the sense that a manual turning between angular positions of a first record in a first holder was sufficient to actuate each of the successive records into a rotational movement between angular inclining positions. At the time such record finder was popular, phonographic records intended to be held thereby were relatively heavy and large varying in weight and size respectively at substantially about 8 ounces in weight and 12 inches in diameter.

Numerous suggestions or advancements in the prior art were attempted so that other objects than phonographs could be held for display and storage in the same type of support structure. Such objects included but were not limited to phonographs, wallpaper samples, thin veneer samples, paint color samples, etc.

In recent years because of the development in modern-day personal and industrial computers, very lightweight floppy disks, compact disks (CD's) and the like are well known commercially. These objects, while being extremely thin, differ from the phonographs in size and also in the fact that they are very light in weight. A support and display structure of the type referred to above and disclosed in the above noted patent was impractical and inefficient for use in the storage of these very light, modern-day objects. This is due to the fact that the automatic and successive pivotal rotation of the holder elements in the prior art record finder structure depended upon the weight of the record to accomplish such automatic successive positioning of all of the holders mounted on the frame. With the floppy disk, CD's and like structures being very lightweight and small, the automatic, successive functioning or repositioning of the holders simply does not work.

Another disadvantage is that floppy disks, diskettes, etc., are not provided with readily recognizable covers. To the contrary, it is important that a certain time be required for the display of each of the items held for purposes of identification. Typically, proper identification of these objects are on relatively small labels or the like which are frequently hard to read. It has therefore become apparent that important modification of the prior art type structures must be required in order to provide an effective and efficient storage and display assembly adaptable for modern-day thin, lightweight objects. In addition, the successive and "automatic" turning of each of the holders which contain an object is no longer a desirable operative feature since more time is now required to view, for purposes of identification, each of the diskettes or like objects being held.

SUMMARY OF THE INVENTION

The present invention is directed towards a support and display assembly for lightweight relatively thin objects such as but not limited to compact disks, diskettes, and/or other disk type structures of the type used as a memory storage facility in computers. The subject assembly comprises a frame preferably having an elongated substantially centrally located opening formed therein and bordered by two elongated side walls. A plurality of holders each dimensioned and configured to support and removably receive preferably a lower portion of the objects being held therein. The holders include mounting means attached thereto for pivotal engagement with the oppositely disposed side walls in a manner which allows a rotational or pivotal movement of the individual holder above the mounting means substantially between two angularly oriented positions.

Further, each of the holders includes a tail portion extending downwardly therefrom. Each of the tail portions are dimensioned and configured to engage the tail portions of the next adjacent holders in a manner which forces the aforementioned pivotal or rotational movement of each of the holders as well as the objects they are supporting, successively when a first or one of the holders and objects are forced between the aforementioned angularly oriented positions.

Another feature of the present invention is the provision of a braking means which is mounted on the frame in frictional engagement with at least a portion of the mounting means of each holder. The braking means is specifically structured to somewhat restrict or limit the pivotal movement of the holder as they are displaced from one angularly oriented position to an opposite angularly oriented position. Such movement would occur, for example, when a user of the subject assembly is searching for one or more of a plurality of contained objects. In order to properly view all of the disks, the user may turn the first holder and disk which, due to the engaging interaction of the tail portions of each of the holders would force the holders, successively, to rotate in an arcuate path of travel between the aforementioned angularly oriented positions. As they are rotated, a certain number, preferably two or three of the objects, would be displayed for observation and identification since their respective holders would be positioned at varying angular orientations between the aforementioned opposite angular positions.

As set forth above, the braking means is provided so that the pivotal displacement of each of the holders, successively, will not occur "automatically" as with known prior art devices commonly referred to as record holders or "record finders."

BRIEF DESCRIPTION OF THE DRAWINGS

For a fuller understanding of the nature of the present invention, reference should be had to the following detailed description taken in connection with the accompanying drawings in which:

FIG. 1 is a side view in section showing operation of the display and support assembly of the present invention.

FIG. 2 is a top view in partial phantom showing insertion of an object being held into one of the holders.

FIG. 3 is a side view of the embodiment of FIG. 2.

FIG. 4 is a transverse sectional view of the embodiment of FIG. 1.

FIG. 5 is a detailed sectional view showing insertion of the holder onto the support frame associated with the display assembly of the present invention.

FIG. 6 is a sectional view in partial cutaway showing the insertion of the holder into the frame utilizing another embodiment of the present invention.

FIG. 7 is a transverse sectional view in partial cutaway similar to that of FIG. 6.

FIG. 8 is a transverse sectional view in partial cutaway similar to that of FIG. 7.

FIG. 9 is a transverse sectional view in partial cutaway similar to that of FIGS. 7 and 8.

FIG. 10 is a transverse sectional view along line 10—10 of FIG. 9.

FIGS. 11 through 16 are various embodiments of the braking structure associated with the subject assembly.

Like reference numerals refer to like parts throughout the several views of the drawings.

DETAILED DESCRIPTION OF THE PREFERRED EMBODIMENT

Figure 17:
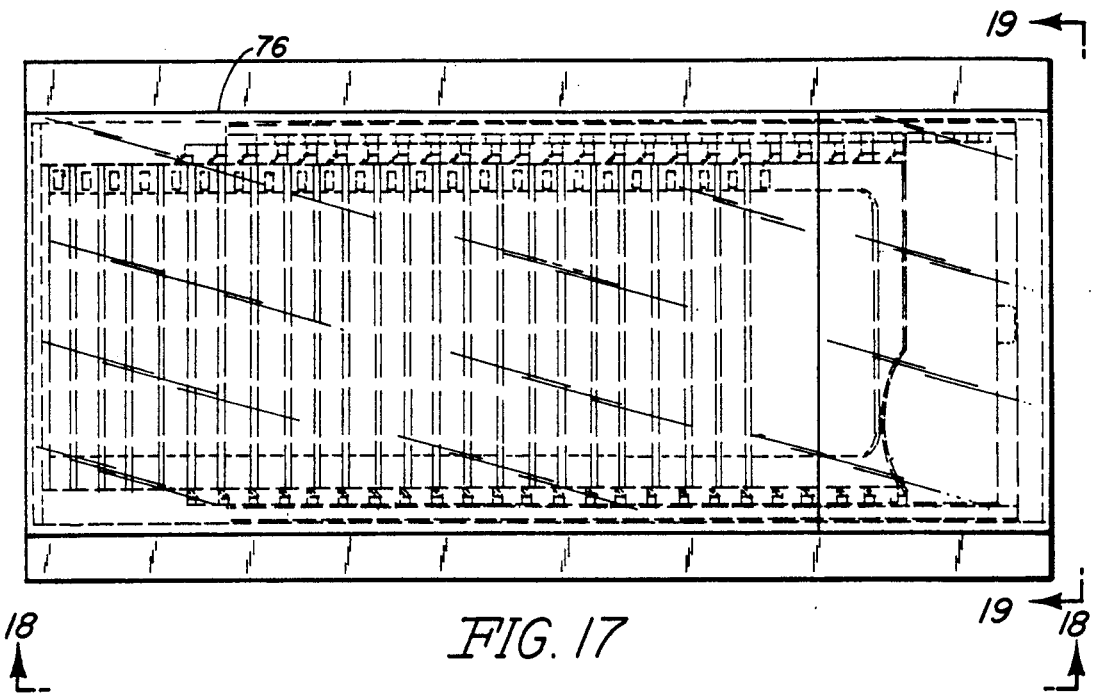
FIG. 17 is a top plan view of the assembly of the present invention with a protective cover thereon.

As shown initially in FIGS. 1 through 4, the present invention relates to a support, storage and display assembly generally indicated as 10. The assembly 10 includes a support frame 12 having a substantially central, elongated opening 14 formed therein. The opening 14 is longitudinally bordered by two elongated spaced apart and substantially parallel side walls 16 and 18 which may be integrally formed as part of the frame 12. A support assembly generally indicated as 20 is removably disposed substantially on the interior of the frame 12 and such support assembly 12 includes two support rails 16' and 18' each disposed substantially adjacent to or contiguous with the respective side walls 16 and 18.

One important feature of the present invention is the removable, "snap-fit" mounting of the support assembly 20 within the support frame 12 such that the plurality of holders 28 extend outwardly and upwardly through the opening 14. Such snap-fit engagement is accomplished by the existence of a plurality of fingers as at 17 and 19 having an angularly oriented "receiving" surface as at 17' and 19'. These fingers are disposed, configured and dimensioned to cooperate and effectively receive depending fingers 23 and 25 formed on the support assembly 20. It should be noted that finger 23 includes an angled surface 27 and finger 25 includes an angled surface 29. The aforementioned "snap-fit" engagement occurs by first placing finger 25 into locking engagement relative to the finger 19 so as to allow a somewhat pivotal movement and confronting engagement between the outer point of the finger as at 31 and the angled surface 29. This rotational movement and confronting engagement occurs as the finger 23 is moved into position and rotated such that the angled surface 27 on the finger 23 confronts and slides relative to the angled surface 17'. The material from which the finger and accordingly, the integrally attached portion of the support assembly 20 is formed is sufficiently flexible to allow an inward bowing and a subsequent outward expansion of the finger 23 into its normal position as pictured in FIG. 1. The support assembly 20 is thereby "snap-fit" into place. Removal of the support assembly may occur by merely inwardly flexing the finger 23 relative to the stabilized or permanent finger 17 thereby allowing the removal of the support assembly.

A plurality of pairs of receiving sections are integrally formed in the support assembly 20 wherein each pair of receiving sections comprises two separate spaced apart but substantially linearly aligned receiving sections generally indicated as 24 and 26. Each pair of receiving sections are formed in spaced apart relation to one another along the length of the opening and more specifically along the length of each of the side rails 16' and 18'. Each of the receiving sections 24 and 26 is defined by a substantially apertured construction of sufficient dimension and configuration to allow a portion of the mounting means associated with each of the holders 28 to pass therethrough. As best shown in FIGS. 5 through 9, the mounting means associated with each holder 28 comprises two spaced apart shafts 30 and 32 each extending transversely outward from an opposite side of a respective holder 28 but preferably disposed in aligned, colinear relation with one another. As demonstrated in FIG. 1, the holders 28 are designed to removably contain at least the lower portion of thin, lightweight objects 36 in a manner which accomplishes efficient storage as well as visual inspection when desired. Each of the holders 28 is pivotally mounted on the frame 12 and is selectively positionable between oppositely disposed angularly oriented positions. Such angularly oriented positions are demonstrated in FIG. 1 by the position of holder 28' and the opposite position by holder 28''. The intermediately positioned holders 28 are disposed in a transitional position as they are being forced between the opposite angular oriented positions demonstrated by that of the holders 28' and 28''. Further, each of the holders 28 includes an outwardly and preferably downwardly extending tail portion 36 which, as shown in FIG. 1, is dimensioned and disposed to movably engage the respective tail portions of the next adjacent holders. Accordingly, when any one of the holders such as 28' is moved from one angular oriented position to the opposite angular oriented position, the respective tail portion as at 36' is forced into abutting and somewhat driving engagement with the next adjacent tail portion 36. The pivotal movement of each of holders 28 relative to the support frame 12 and more specifically, the support assembly 20, causes interaction and movable engagement of each of the successive tail portions 36. This engagement causes each of the holders to be angularly displaced between the aforementioned opposite angularly oriented positions and to pass through a predetermined arc. As also shown, two or three of the holders and the objects stored therein are in an intermediate position which facilitates viewing and identifying. This is amply demonstrated in FIG. 1. The forced movement of any one of the holder assemblies into a pivotal displacement as shown will force the next subsequent holder to begin its pivotal or rotational travel between the aforementioned angularly oriented positions due to the interaction of the respective tail portions 36.

An important feature of the present invention is the existence of a braking means generally indicated as 40. Depending upon the embodiment, the braking means is formed on at least one of the rails, as on rail 18' (see FIGS. 5 through 16) and is preferably formed along or as part of an undersurface thereof as at 23. The braking means is structured in the form of an elongated strip in the embodiments of FIGS. 5 through 9 and is formed of a material which serves to frictionally engage the outer surface of the shaft 32 and thereby, somewhat restrict or limit the ease with which it rotates during the pivotal displacement of the holder 28 associated therewith. The strip 42 is adhered or otherwise secured within an elongated channel integrally formed in the under surface 23. Alternately, as shown in FIGS. 11 and 12, the braking means may be in the form of a plurality of spaced apart braking structures 46 or 48. Each of the braking structures 46 or 48 are structured to frictionally engage a portion of the outer surface of the shaft 32 so as to restrict its rotational movement and thereby, restrict or somewhat limit the ease with which the holders 28 pass through their arcuate path between the aforementioned angularly oriented positions. In the embodiment of FIG. 11, the braking structure 46 in the form of two spaced apart, parallel depending fingers 47 disposed to straddle the inwardly received shaft 32 and frictionally engage the outer surface thereof at a plurality of points.

In the embodiment of FIG. 12, the braking structure 48 comprises a somewhat curvilinear engaging or braking surface 49 which is disposed in frictional engagement with an outer surface portion of the shaft 32.

As shown in FIGS. 10 and 13 through 16, the materials from which the strip 42 is formed may vary and the embodiments of FIGS. 10 and 13 through 16 respectively represent polyester felt, cardboard, an elastic material plastic and an integral, fairly secured plastic.

Also, it is noted that another important feature of the present invention is the ease in removably attaching each of the holders to the support frame 12 and more specifically, to the support assembly 20 disposed on the interior thereof. Such removable attachment is accomplished by cooperative structural features of the mounting means including the shafts 30 and 32 and the receiving sections 24 and 26.

With reference to FIGS. 6, 7 and 8, such attachment is accomplished by initially inserting shaft 32 into the apertured construction of the receiving section 26. It should be noted that shaft 32 has a longer longitudinal dimension than shaft 30. This is utilized to the extent that the shaft 32 is inserted to its entire length until the shaft 32 is well beneath the undersurface of the side rail 18' as shown in FIG. 6. Once in the position shown, the opposite shaft 30 will be able to enter the apertured construction of the oppositely disposed receiving section 24. A downward depression as indicated by directional arrow 51 will result in an upward flexing or displacement of the side rail 18' as clearly shown in FIG. 8. The downward force as at 51 will also align the shaft 30 with the apertured construction 24. An axial force as indicated by directional arrow 52 will result in a proper, operative positioning of the mounting means and the respective holder 28 as appears in FIG. 9. In such operative position, the outer surface of the shaft 32 is in frictional engagement with the braking means such as the strip 42.

With regards to FIGS. 2, 3, 4 and 21, the holder itself is formed to include a receiving pocket defined by a front wall and a rear wall 60 and 62 respectively. Each of these walls includes an upwardly extending, integrally formed and coplanar flange as at 64 and 66 respectively. The flanges are spaced from one another as are the front and rear walls 60 and 62 respectively but are also spaced from one another longitudinally along the length of the respective holder (see FIGS. 2 and 4). Further, each of the flanges extend along the length of the respective upper peripheral edges of the walls 60 and 62 a distance less than half the entire length thereof so as to provide a receiving space 68 between the inner most peripheral edges thereof as at 64' and 66' respectively. The receiving pocket of the holder is formed in the base thereof and is designated in both FIGS. 2 and 4 as 70. This receiving pocket is designed to hold the lower portion of the object 36 therein so as to allow it to be easily removed. The flanges 64 and 66 as well as the respective walls 60 and 62 to which they are attached allow for the insertion of the object 36 by first providing a twisting motion (see FIG. 21) of the object 36 once it has been placed substantially at an angular orientation within the receiving space 68. Once positioned in parallel relation to the flanges 64 and 66, it is "dropped" therebetween and falls into the receiving pocket 70 for storage and movement with the respective holder 28 as it is selectively positioned between the aforementioned angularly oriented positions.

Figure 18:
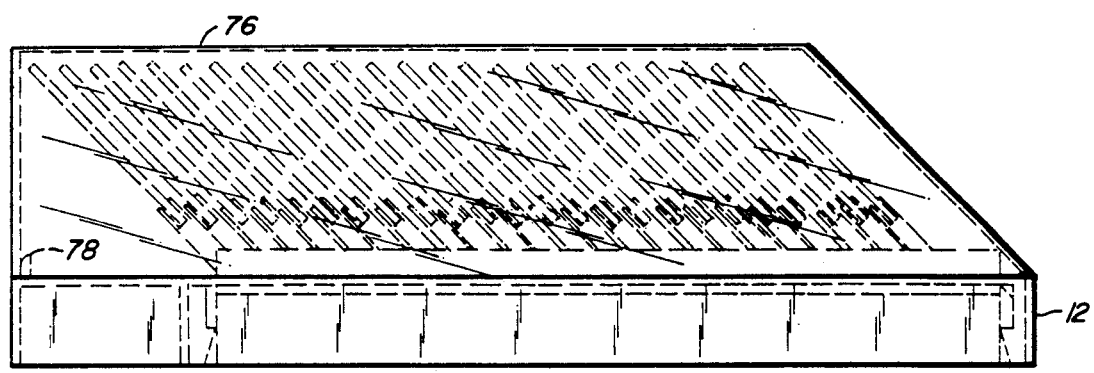
FIG. 18 is a longitudinal side view along line 18—18 of FIG. 17.
Figure 19:
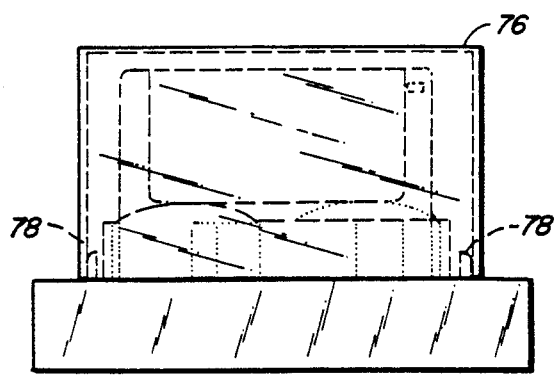
FIG. 19 is an end view along line 19—19 of FIG. 17.

With regards to the embodiments of FIGS. 17 through 19, a protective cover or lid 76 may be provided so as to enclose the holders 28 and any objects 36 contained therein in a protective environment. Such cover 76 may be formed from a transparent, translucent or opague material and is sufficiently dimensioned and configured within its hollow interior to completely and encase the objects 36 and holders 28 when in one of a preferred angularly oriented position and in substantially parallel relation to one another as clearly shown in FIG. 18. Upwardly extending mounting fingers as at 78 may protrude outwardly from the upper surface 12' of the support frame 12 so as to movably but frictionally engage the cover 76 in its covering position as shown.

Figure 20:
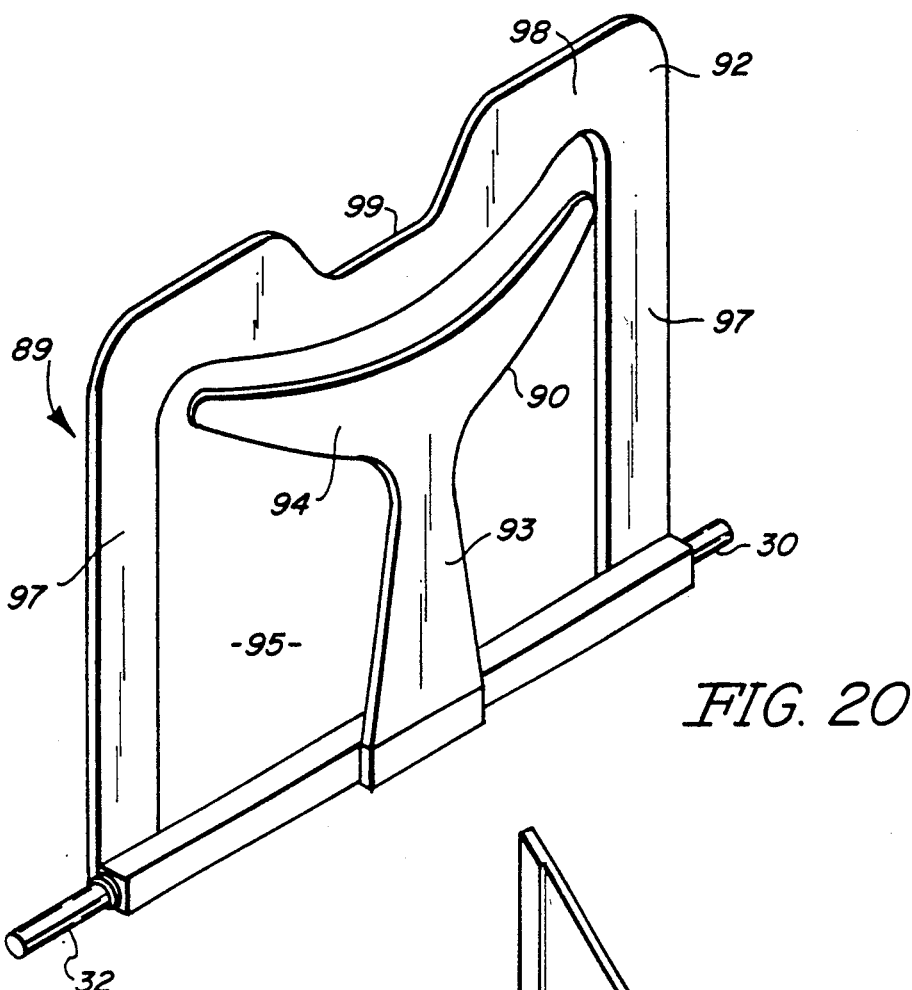
FIG. 20 is a perspective view of an alternate embodiment of the holder.
Figure 21:
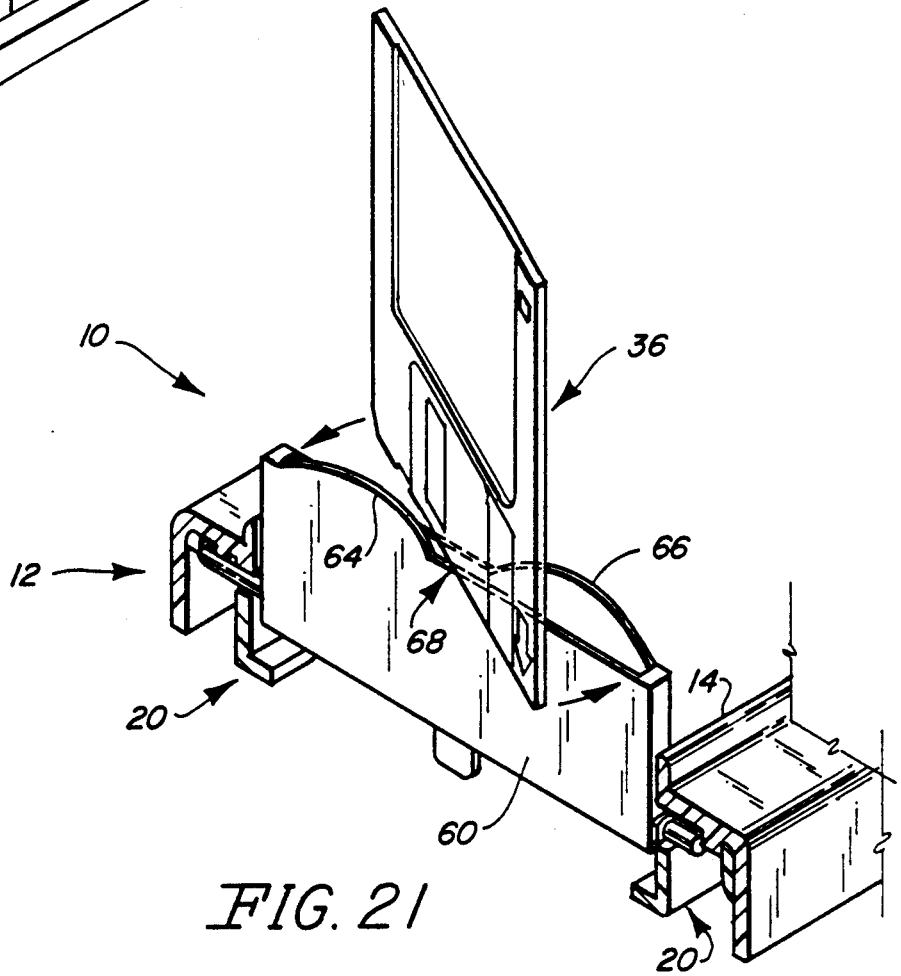
FIG. 21 is a perspective view of the holder fitting within the frame of the present invention.

With regard to FIG. 20, another embodiment of the present invention is a structure of the holder member including similar outwardly extending fingers 30 and 32 for removable mounting on the support assembly 20. One difference being is that instead of the pocket type structure as described in detail with regard to FIG. 21, the subject holder assembly comprises a first support member as at 90 spaced from a second larger and more longitudinally expansive support member 92. The space therebetween is dimensioned to receive a conventional envelope in which a floppy disk or like member is usually maintained. Such envelope, as is conventionally known, may be maintained between the two support members 90 and 92 while the floppy disk itself may be removed from the envelope. Obviously, the conventional envelope (not shown for purposes of clarity) is provided to maintain dust off of any of the floppy disks or operative features thereof. As is apparent from a review of FIG. 20, member 90 includes an upwardly extending arm 93 and an outwardly extending somewhat enlarged head portion 94. The second support member is a frame like construction having somewhat central opening 95 and two spaced apart legs 97 disposed in substantially parallel relation to one another and interconnected at an upper most end by a cross member 98. A cutout as at 99 defines a finger notch of sufficient disposition, dimension and configuration to allow gripping, by the fingers of the user, of the disk in a manner which may allow the floppy disk to be removed from the supportive and protective envelope disposed and maintained in the space between the support members 90 and 92. Therefore, every floppy disk maintained within a holder of the type shown in FIG. 20 and represented as a 89 may be instantly removable while the envelope is retained therein while allowing both the floppy disk and the envelope to be fully supported regardless of the attitude the pivotally mounted holder 89 is positioned. Further, the structure, configuration and disposition of the support members 90 and 92 allow for the adequate support and maintenance of an envelope and floppy disk even though such material may be much more flexible than the substantially rigid diskette since they are formed from a thinner material.

Now that the invention has been described, what is claimed is:

1. A holder and display assembly for the storage of a plurality of thin, relatively lightweight objects, said assembly comprising:
   a support frame including a central opening boarded along opposite longitudinal side walls by spaced apart elongated rails,
   a plurality of pairs of receiving sections formed in said rails and each receiving section of each pair disposed in aligned, linear relation to one another,
   a plurality of holders each rotatably mounted in spaced relation to one another on said frame and disposable between opposite, angularly oriented positions,
   each of said holders including a mounting means disposed and structured for removable mounting and pivotal support of the respective holder on said frame and within said opening, and said mounting means of each holder removably secured to one of said pairs of receiving sections,
   each of said holders including a receiving pocket having an open mouth and a substantially hollow interior disposed and configured to removably receive a lower end of the object being held therein, said receiving pocket including two spaced apart offset flanges each extending upwardly from an upper peripheral edge of said mouth, each flange being attached in co-planar relation to a different one of a front wall and a rear wall of said holder and disposed in confronting disposition with opposite surfaces of the object upon a substantially twisting movement of the object during insertion thereof relative to said holder,
   braking means including an elongated strip disposed in frictional engagement with each of said mounting means adjacent said receiving sections and structured and disposed for restrictive, limited movement of each of said mounting means and corresponding ones of said holders relative to said frame between said opposite, angularly oriented positions,
   each of said holders including a tail portion extending outwardly from a bottom thereof, each of said tail portions being disposed in substantially aligned and driving, engaging, abutting relation to a next adjacent tail portion during pivotal displacement of the corresponding holder thereof relative to said frame, and
   one of said side walls being formed of a material of sufficient flexibility to be displaced out of a normal position upon insertion and forced engagement with said mounting means when positioning each of said holders in secured position within a corresponding one of said pairs of receiving sections.

2. An assembly as in claim 1 wherein each of said flanges include an inner edge longitudinally spaced from one another along the length of said holder a distance sufficient to insert the object therebetween.

3. An assembly as in claim 1 wherein said tail portions are disposed in spaced, substantially parallel relation to one another when the corresponding holders thereof are disposed in corresponding angularly oriented positions.

4. An assembly as in claim 1 wherein said braking means is formed on and extends along at least one of said side walls in engaging relation with a correspondingly positioned portion of each of said mounting means at spaced locations adjacent said receiving sections along the length of said one side wall.

5. An assembly as in claim 4 wherein said braking means comprises a plurality of spaced apart braking structures each disposed in frictional engagement with said correspondingly positioned portion of each of said mounting means adjacent said receiving sections at spaced locations along the length of said one side wall.

6. An assembly as in claim 5 wherein at least one of said braking structures comprises two spaced apart parallel fingers disposed on opposite sides of and in engagement with said correspondingly disposed portion of said mounting means, each of said fingers extending outwardly in a common direction from said one side wall and each terminating in an open end, said fingers relatively disposed to allow passage of said correspondingly positioned portion of said mounting means through said fingers at least partially beyond said free ends of said fingers.

7. An assembly as in claim 5 wherein at least one of said braking structures comprises a receiving pocket having a congruently receiving and engaging surface relative to said correspondingly positioned portion of said mounting means and disposed in receiving and frictional engagement therewith.

8. An assembly as in claim 1 wherein said mounting means comprises at least one shaft extending transversely outwardly from one side of each of said holders and further dimensioned to be received in one receiving section of a receiving section pair mounted adjacent a corresponding one of said side walls of said frame, said shaft disposed in frictional engagement with said braking means when disposed in its operative position.

9. An assembly as in claim 8 wherein said mounting means comprises two shafts disposed in aligned, spaced apart and substantially coaxial relation with one another and each shaft extending transversely outward from opposite sides of said holders, each of said shafts disposed to pass into receiving engagement with receiving sections of a correspondingly positioned receiving section pair, said operative position of said holder defined by pivotal movement of said holder relative to said frame about a central longitudinal axis of said shaft.

10. An assembly as in claim 8 wherein said one side wall is formed of material of sufficient flexibility to be displaced out of its normal position upon insertion and forced engagement with said one shaft upon positioning of said one shaft through the correspondingly positioned receiving section formed on said one side wall.

11. An assembly as in claim 10 wherein said braking means is formed on an undersurface of said one rail in frictional engagement with said one shaft and formed of a material sufficient to restrict rotational movement of said one shaft and pivotal movement of said one holder relative to said one shaft.

12. An assembly as in claim 11 wherein said correspondingly positioned receiving section formed adjacent said one side wall has an apertured construction of sufficient dimension to allow passage therethrough of said one shaft into operative engagement with said braking means.

13. An assembly as in claim 1 wherein at least one of said plurality of holders comprises two spaced apart, substantially parallel support members disposed on opposite sides and in confronting engagement with opposite surfaces of an object maintained therebetween, one of said support members having a central opening bounded by a peripherally disposed frame member, a second of said support members having an upstanding base integrally secured to an enlarged head, wherein said head extends laterally outwardly from opposite sides of said base and wherein said base and said head are collectively dimensioned to be disposed within the peripheral frame in substantial alignment with said central opening.

* * * * *